US012630375B2

(12) United States Patent
Uchiumi et al.

(10) Patent No.: US 12,630,375 B2
(45) Date of Patent: May 19, 2026

(54) FUEL CELL SEPARATOR CONVEYANCE APPARATUS AND FUEL CELL SEPARATOR CONVEYANCE METHOD

(71) Applicant: Honda Motor Co., Ltd., Tokyo (JP)

(72) Inventors: Satoru Uchiumi, Tokyo (JP); Tatsuya Hasegawa, Tokyo (JP); Kento Mizutani, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/042,709

(22) Filed: Jan. 31, 2025

(65) Prior Publication Data

US 2025/0250131 A1 Aug. 7, 2025

(30) Foreign Application Priority Data

Feb. 6, 2024 (JP) .................................. 2024-016165

(51) Int. Cl.
*B65G 59/02* (2006.01)
*H01M 8/0258* (2016.01)
*H01M 8/0267* (2016.01)

(52) U.S. Cl.
CPC ........... *B65G 59/02* (2013.01); *H01M 8/0258* (2013.01); *H01M 8/0267* (2013.01)

(58) Field of Classification Search
CPC ........ B65G 61/00; B65G 59/04; B65G 59/02; B65G 59/045; B65G 59/005; B65G 57/005; H01M 8/0258; H01M 8/0267
See application file for complete search history.

(56) References Cited

U.S. PATENT DOCUMENTS

| | | | | | |
|---|---|---|---|---|---|
| 4,361,062 | A | * | 11/1982 | Reiff .................... | B21D 43/287 |
| | | | | | 414/796.4 |
| 4,567,081 | A | * | 1/1986 | VanHorne .............. | B65H 39/00 |
| | | | | | 206/412 |
| 4,960,361 | A | * | 10/1990 | Melzer ..................... | B65H 3/46 |
| | | | | | 414/793 |
| 5,632,595 | A | * | 5/1997 | Mori .................... | B65G 49/069 |
| | | | | | 414/797 |

(Continued)

FOREIGN PATENT DOCUMENTS

| | | | | | |
|---|---|---|---|---|---|
| CN | 112777539 | A | * | 5/2021 | ............. B67B 3/061 |
| CN | 114132751 | A | * | 3/2022 | ............. B65G 47/04 |

(Continued)

*Primary Examiner* — Gregory W Adams
(74) *Attorney, Agent, or Firm* — Duft & Bornsen, PC

(57) ABSTRACT

A fuel cell separator conveyance apparatus including a movable body having an opposing surface extending in a substantially horizontal direction and facing an upper surface of a separator, a suction part provided on the movable body to generate a suction to hold the separator on the movable body, and a support part movably supporting the movable body. A first communication hole communicating with a flow path of a reaction gas and a second communication hole communicating with at least one of a plurality of through-holes of the separator are provided in the movable body, and the suction part includes a first section part holding the separator on the movable body through the suction via the first communication hole, and a second suction part holding the protective sheet on the movable body through the suction via the second communication hole.

18 Claims, 9 Drawing Sheets

(56) References Cited

U.S. PATENT DOCUMENTS

| | | | | | |
|---|---|---|---|---|---|
| 5,653,575 | A | * | 8/1997 | Park | B65G 47/918 |
| | | | | | 414/797 |
| 5,899,341 | A | * | 5/1999 | Irita | B65H 3/443 |
| | | | | | 414/789.5 |
| 6,641,131 | B2 | * | 11/2003 | Stohr | B65H 3/0883 |
| | | | | | 271/107 |
| 8,652,664 | B2 | * | 2/2014 | Akiyama | H01M 8/2483 |
| | | | | | 429/444 |
| 11,011,760 | B2 | * | 5/2021 | Yano | B65G 49/068 |

FOREIGN PATENT DOCUMENTS

| | | | | | |
|---|---|---|---|---|---|
| JP | 2019145417 | A | | 8/2019 | |
| KR | 102319367 | B1 | * | 10/2021 | B65G 59/04 |

* cited by examiner

DETAILED VIEW OF
PART A

FUEL CELL SEPARATOR CONVEYANCE APPARATUS AND FUEL CELL SEPARATOR CONVEYANCE METHOD

CROSS-REFERENCE TO RELATED APPLICATION

This application is based upon and claims the benefit of priority from Japanese Patent Application No. 2024-016165 filed on Feb. 6, 2024, the content of which is incorporated herein by reference.

BACKGROUND OF THE INVENTION

Field of the Invention

This invention relates to a fuel cell separator conveyance apparatus and fuel cell separator conveyance method configured to convey a fuel cell separator.

Description of the Related Art

In recent years, technological developments have been made on a fuel cell that contribute to energy efficiency in order to ensure access to energy that is affordable, reliable, sustainable and advanced by more people. As a conventional technology for conveying a fuel cell separator included in this type of fuel cell, there is a known apparatus which transports a separator stacked through a protective sheet by suction. Such an apparatus is described, for example, in Japanese Unexamined Patent Publication No. 2019-145417 (JP 2019-145417 A). In the apparatus described in JP 2019-145417 A, considering that a protective sheet adheres to the underside of the separator during suction, air is blown onto the protective sheet simultaneously with or after the suction of the separator to remove the protective sheet from the underside of the separator.

However, the protective sheet does not always adhere to the underside of the separator during suction. Therefore, there is a risk that the protective sheet may fall off the separator at an unintended position due to free fall.

SUMMARY OF THE INVENTION

An aspect of the present invention is a fuel cell separator conveyance apparatus configured to convey a separator for a fuel cell, the separator being stacked through a protective sheet and having an upper surface and a lower surface, a flow path for a reaction gas being formed in the separator, a plurality of through-holes through which the reaction gas and a cooling medium pass are provided in the separator. The fuel cell separator conveyance apparatus includes: a movable body including an opposing surface extending in a substantially horizontal direction and facing the upper surface of the separator; a suction part provided on the movable body and configured to generate a suction so as to hold the separator on the movable body; and a support part configured to movably support the movable body. A first communication hole communicating with the flow path and a second communication hole communicating with at least one of the plurality of through-holes are provided in the movable body, and the suction part includes a first section part configured to hold the separator on the movable body through the suction via the first communication hole, and a second suction part configured to hold the protective sheet on the movable body through the suction via the second communication hole.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 12. A fuel cell separator conveyance apparatus according to an embodiment of the present invention is a conveyance apparatus for a separator of a fuel cell. Therefore, first, the configuration of the fuel cell, particularly the configuration of a fuel cell stack including the separator, will be described.

Figure 1:
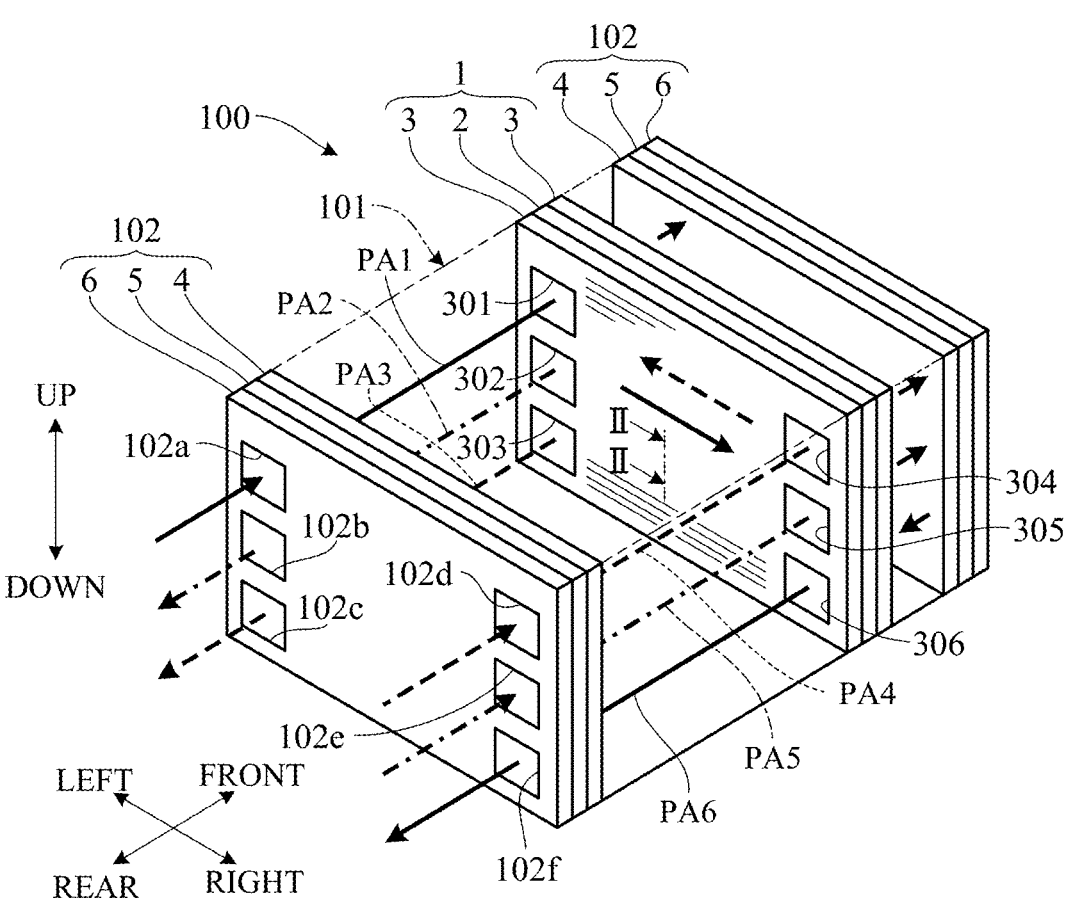
FIG. 1 is a perspective view schematically showing an overall configuration of a fuel cell stack having a separator to which a fuel cell separator conveyance apparatus according to an embodiment of the present invention is applied.

FIG. 1 is a perspective view schematically showing an overall configuration of a fuel cell stack 100. Hereinafter, for the sake of convenience, three-axis directions orthogonal to each other as illustrated in the drawing are defined as a front-rear direction, a left-right direction, and an up-down direction, and a configuration of each part will be described according to such definitions. These directions may be different from a front-rear direction, a left-right direction, and an up-down direction of the vehicle. For example, the front-rear direction of FIG. 1 may be the front-rear direction, the left-right direction, or the up-down direction of the vehicle. The front-rear direction in FIG. 1 is a stacking direction of the fuel cell stack 100, and when assembling the fuel cell stack 100, the stacking direction is aligned with the direction of gravity.

As shown in FIG. 1, the fuel cell stack 100 has a cell stacked body 101 formed by stacking a plurality of power generation cells 1 in the front-rear direction, and end units 102 arranged at both front and rear ends of the cell stacked body 101, and the whole of the fuel cell stack 100 has a substantially rectangular parallelepiped shape. The length of the cell stacked body 101 in the left-right direction is longer than its length in the up-down direction. For convenience, a single power generation cell 1 is shown in FIG. 1.

The power generation cell 1 has a unitized electrode assembly (hereinafter, referred to as a "UEA") 2 including a joint body (a membrane electrode assembly) that includes an electrolyte membrane and electrodes, and separators 3 and 3 arranged on both sides in the front-rear direction of the UEA 2. The UEA 2 can also be referred to as a membrane electrode structure. The UEA 2 and the separator 3 are alternately arranged in the front-rear direction. The separator 3 placed on the front side of the UEA 2 is called an anode separator, and the separator 3 placed on the rear side of the UEA 2 is called a cathode separator. Although not illustrated, the cell stacked body 101 is covered by a case with a substantially rectangular parallelepiped shape.

Figure 2:
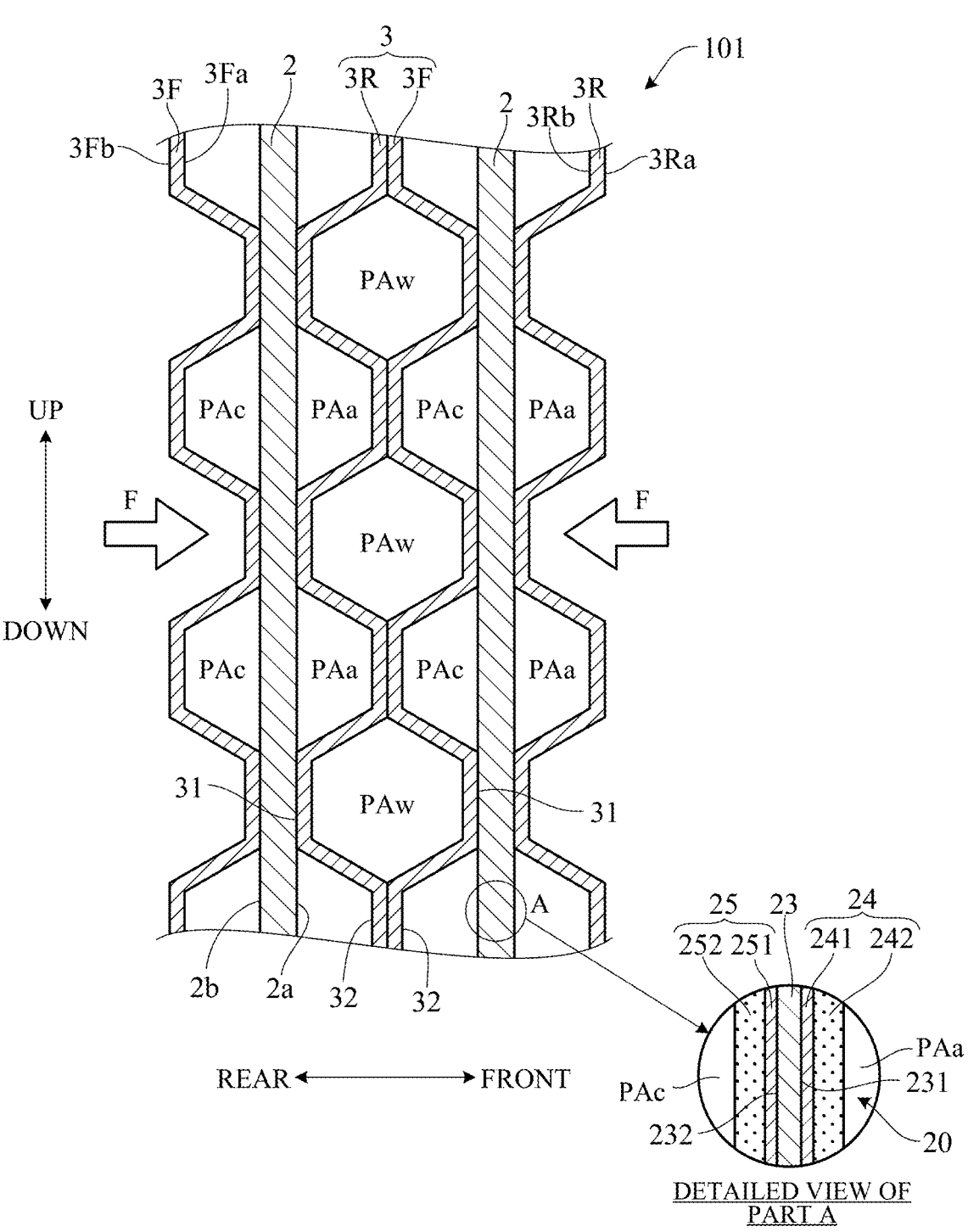
FIG. 2 is a cross-sectional view taken along line II-II in FIG. 1.

FIG. 2 is a cross-sectional view (along line II-II in FIG. 1) of the central part in the left-right direction of the cell stacked body 101. As shown in FIG. 2, the separator 3 has a front plate 3F and a rear plate 3R, which are a pair of metal thin plates with a corrugated cross-section. The front plate 3F extends in the up-down and left-right directions and has a front surface 3Fa facing the front and a rear surface 3Fb facing the rear. The rear plate 3R extends in the up-down, and left-right directions, and has a front surface 3Ra facing the front and a rear surface 3Rb facing the rear. The rear surface 3Fb of the front plate 3F and the front surface 3Ra of the rear plate 3R facing each other are joined together by welding or the like at their outer peripheral edges. Thus, the front plate 3F and the rear plate 3R are integrally joined to form a separator 3. The separator 3 uses a conductive material with excellent corrosion resistance, such as stainless steel, titanium, or titanium alloy.

Inside the separator 3 enclosed by the front plate 3F and the rear plate 3R, that is, between the rear surface 3Fb of the front plate 3F and the front surface 3Ra of the rear plate 3R, a cooling flow path PAw through which a cooling medium flows is formed. The generating surface of the power generation cell 1 is cooled by the flow of the cooling medium. Water, for example, can be used as the cooling medium. The surface (front surface 3Fa and rear surface 3Rb) of the separator facing the UEA 2 is configured with an uneven shape by press molding or the like to form a gas flow path between the surface of the separator 3 and the UEA 2. More specifically, a pair of front and rear separator 3 and 3 have a pair of front and rear protrusions 31 and 31 protruding towards the UEA 2, and a pair of front and rear recess portions 32 and 32, which are concavely formed in continuation to the pair of front and rear protrusions 31 and 31.

The pair of front and rear protrusions 31 and 31 come into contact with the front surface 2a and the rear surface 2b of the UEA 2. In the cell stacked body 101, a compressive load F is applied in the front-rear direction during the assembly of the fuel cell stack 100, and this compressive load F is maintained after the assembly of the fuel cell stack 100 is completed. Therefore, a predetermined surface pressure due to the compressive load F acts in the front-rear direction on the UEA 2 through the protrusions 31 and 31.

Between the front surface 2a of the UEA 2 and the rear plate 3R of the separator 3 facing this front surface 2a, an anode flow path PAa through which fuel gas (anode gas) flows is formed by the recess portion 32. Between the rear surface 2b of the UEA 2 and the front plate 3F of the separator 3 facing this rear surface 2b, a cathode flow path PAc through which oxidant gas (cathode gas) flows is formed by the recess portion 32. For example, hydrogen gas can be used as the fuel gas, and air can be used as the oxidant gas. The fuel gas and the oxidant gas may be referred to as a reaction gas without being distinguished from each other.

Figure 3:
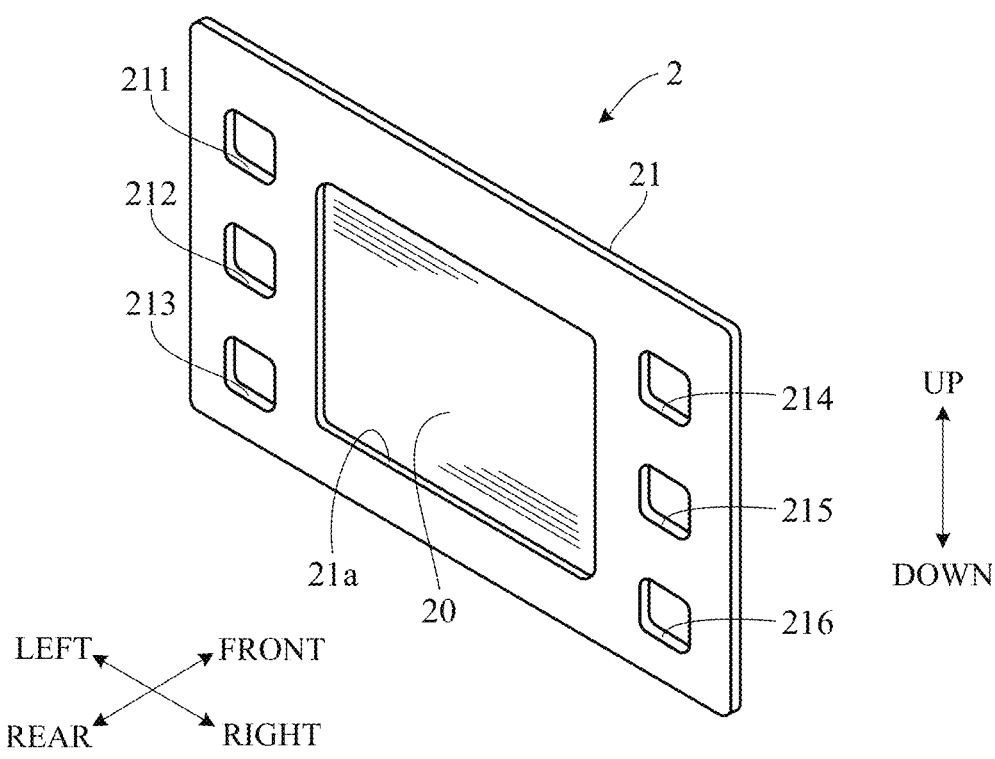
FIG. 3 is a perspective view showing a schematic configuration of the unitized electrode assembly included in the fuel cell stack of FIG. 1.

FIG. 3 is a perspective view showing a schematic configuration of the UEA 2. As shown in FIG. 3, the UEA 2 includes a substantially rectangular membrane electrode assembly (hereinafter, referred to as a "MEA") 20 and a frame 21 that supports the MEA 20. As shown in the detailed view of part "A" in FIG. 1, the MEA 20 has an electrolyte membrane 23, an anode electrode 24 provided on a front surface 231 of the electrolyte membrane 23, and a cathode electrode 25 provided on a rear surface 232 of the electrolyte membrane 23.

The electrolyte membrane 23 is, for example, a solid polymer electrolyte membrane, and a thin film of perfluorosulfonic acid polymer containing moisture can be used. Not only a fluorine-based electrolyte but also a hydrocarbon-based electrolyte can be used.

The anode electrode 24 has an electrode catalyst layer 241 formed on the front surface 231 of the electrolyte membrane 23 and served as a reaction field for electrode reaction, and a gas diffusion layer 242 formed on the front surface of the electrode catalyst layer 241 to spread and supply the fuel gas. An intermediate layer (underlayer) can also be provided between the electrode catalyst layer 241 and the gas diffusion layer 242.

The cathode electrode 25 has an electrode catalyst layer 251 formed on the rear surface 232 of the electrolyte membrane 23 and served as a reaction field for electrode reaction, and a gas diffusion layer 252 formed on the rear surface of the electrode catalyst layer 251 to spread and supply the oxidant gas. An intermediate layer (underlayer) can also be provided between the electrode catalyst layer 251 and the gas diffusion layer 252.

In the anode electrode 24, the fuel gas (hydrogen) supplied through the anode flow path PAa is ionized by an action of a catalyst, passes through the electrolyte membrane 23, and moves to the cathode electrode side. Electrons generated at this time pass through an external circuit and are extracted as electric energy. In the cathode electrode 25, an oxidant gas (oxygen) supplied via the cathode flow path PAc reacts with hydrogen ions guided from the anode electrode 24 and electrons moved from the anode electrode 24 to generate water. The generated water gives an appropriate humidity to the electrolyte membrane 23, and excess water is discharged to an outside of the UEA 2 along the gas flow.

As illustrated in FIG. 3, the frame 21 is a thin plate having a substantially rectangular shape, and is made of an insulating resin, rubber, or the like. A substantially rectangular opening 21a is provided in a central portion of the frame 21. The MEA 20 is disposed to cover the entire opening 21a and a peripheral portion of the MEA 20 is supported by the frame 21.

Three through-holes 211 to 213 penetrating the frame 21 in the front-rear direction are opened side by side in the up-down direction on the left side of the opening 21a of the frame 21. Three through-holes 214 to 216 penetrating the frame 21 in the front-rear direction are opened side by side in the up-down direction on the right side of the opening 21a of the frame 21. The through-holes 211 to 216 are all shown as rectangular for convenience, but the shape of the through-holes 211 to 216 is not limited to this.

As shown in FIG. 1, in the separator 3 in front of and behind the UEA 2, through-holes 301 to 306 penetrating the separators 3 in the front-rear direction are opened at positions corresponding to the through-holes 211 to 216 of the frame 21. The through-holes 301 to 306 communicate with the through-holes 211 to 216 of the frame 21, respectively. The set of the through-holes 211 to 216 and 301 to 306 communicating with each other forms flow paths PA1 to PA6 (indicated by arrows for the sake of convenience) penetrating the cell stacked body 101 and extending in the front-rear direction. The flow paths PA1 to PA6 may be referred to as manifolds. The flow paths PA1 to PA6 are connected to a manifold outside the fuel cell stack 100.

The front and rear end units 102 of the cell stacked body 101 have a plurality of plates 4 to 6 arranged to be stacked in the front-rear direction. More specifically, the end unit 102 includes a terminal plate 4 disposed on the inside in the front-rear direction, an insulating plate 5 disposed on the outside in the front-rear direction of the terminal plate 4, and an end plate 6 disposed on the outside in the front-rear direction of the insulating plate 5.

The terminal plate 4 is a substantially rectangular plate-shaped member made of metal, and has a terminal portion for extracting electric power generated by an electrochemical reaction in the cell stacked body 101. The insulating plate 5 is a substantially rectangular plate-shaped member made of non-conductive resin or rubber, and electrically insulates the terminal plate 4 from the end plate 6. The end plate 6 is a plate-shaped member made of metal or resin having high strength.

In FIG. 1, for convenience, the end unit 102 and the cell stacked body 101 are shown as having the same size when viewed from the rear (the length in the up-down direction is the same and the length in the left-right direction is the same). However, in reality, the end unit 102 is larger than the cell stacked body 101, and the edge of the end unit 102 (for example, the end plate 6) protrude in the up-down and the left-right directions beyond the edge of the cell stacked body 101. The protruding portions of these end units 102 are fixed by bolts or the like to the front and rear ends of a case (not shown) provided around the cell stacked body 101.

In the front end unit 102, a plurality of through-holes 102f penetrating the end unit 102 in the front-rear direction are opened at positions corresponding to the through-holes 211 to 216 and 301 to 306. For convenience, the through-holes 102a to 102f are all shown as having a substantially rectangular shape, but the shape of the through-holes 102a to 102f is not limited to this.

A fuel gas tank storing high-pressure fuel gas is connected to the through-hole 102a via an ejector, an injector, etc., and the fuel gas (anode gas) is supplied to the fuel cell stack 100 through the through-hole 102a along the flow path PA1 indicated by a solid line. This fuel gas is guided to the anode flow path PAa between the UEA 2 and the rear plate 3R of the separator 3 through the through-holes 211 and 301. The fuel gas after passing through the anode flow path PAa, that is, fuel exhaust gas (anode off-gas) is discharged from the through-hole 102f along the flow path PA6 indicated by a solid line through the through-holes 216 and 306.

A compressor for supplying oxidant gas is connected to the through-hole 102d, and the oxidant gas (cathode gas) compressed by the compressor is supplied to the fuel cell stack 100 through the through-hole 102d along the flow path PA4 indicated by a dotted line. This oxidant gas is guided to the cathode flow path PAc between the UEA 2 and the front plate 3F of the separator 3 through the through-holes 214 and 304. The oxidant gas after passing through the cathode flow path Pac, that is, oxidant exhaust gas (cathode off-gas) is discharged from the through-hole 102c along the flow path PA3 indicated by a dotted line through the through-holes 213 and 303.

A pump for supplying cooling medium is connected to the through-hole 102e, and the cooling medium is supplied to the fuel cell stack 100 through the through-hole 102e along the flow path PA5 indicated by a chain line. This cooling medium is guided to the cooling flow path PAw between the front plate 3F and the rear plate 3R of the separator 3 through the through-holes 215 and 305. The cooling medium after passing through the cooling flow path PAw is discharged from the through-hole 102b along the flow path PA2 indicated by a chain line through the through-holes 212 and 302. The discharged cooling medium is cooled by heat exchange in a radiator and is supplied again to the fuel cell stack 100 through the through-hole 102e. A schematic configuration of the fuel cell stack 100 has been described above.

Figure 4:
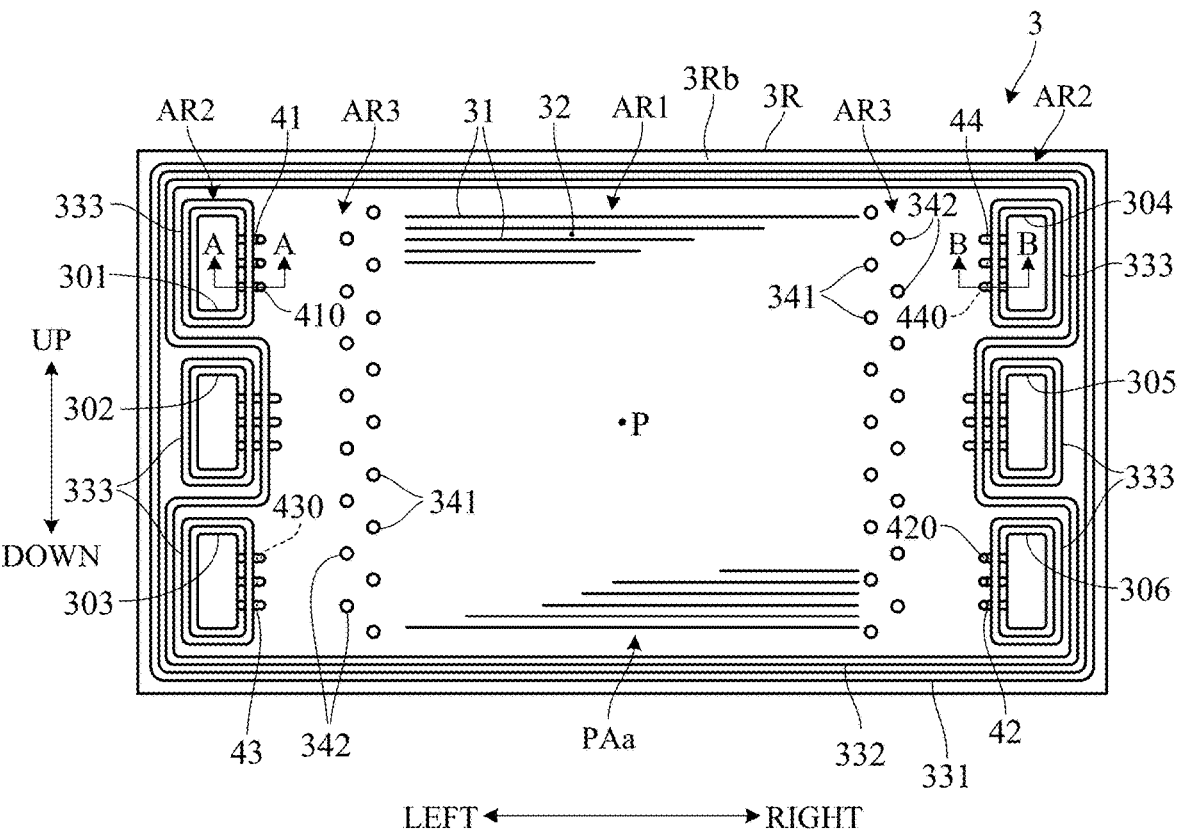
FIG. 4 is a rear view of the separator in FIG. 1.

The configuration of the separator 3 will be described in more detail. FIG. 4 is a rear view (a view viewed from the rear) of the separator 3. That is, FIG. 4 is a view illustrating the rear surface 3Rb of the rear plate 3R facing the anode electrode 24 on the front surface 2a of the UEA 2. A point P in the drawing is an intermediate point in the left-right direction and an intermediate point in the up-down direction of the separator 3, and is referred to as a center point. The left-right direction and the up-down direction in FIG. 4 correspond to a longitudinal direction and a transverse direction of the separator 3, respectively.

In FIG. 4, a region facing the MEA 20 of the UEA 2, that is, a region AR1 facing the power generation surface is referred to as an active region of the separator 3, and regions other than the active region are referred to as inactive regions. Since the active region AR1 is located at the central portion of the separator 3 in the left-right direction, the active region AR1 is sometimes referred to as a central region of the separator 3.

Of the inactive regions, a region at an end in the left-right direction where the through holes 301 to 306 are provided is referred to as an end region AR2 of the separator 3. Of the inactive regions, a region inside the end region AR2 in the left-right direction is referred to as a connection region AR3 of the separator 3. The connection regions AR3 are located between the active region AR1 and the left and right end regions AR2.

As shown in FIGS. 2 and 4, in the active region AR1 of the separator 3, the plurality of protrusions 31 are provided to protrude rearward at equal intervals in the up-down direction over substantially the entire region although a part thereof is not illustrated. Each of the plurality of protrusions 31 extends in the left-right direction, and the recess portion 32 is provided between the protrusions 31 and 31 adjacent in the up-down direction. The anode flow path PAa is formed between the plurality of recess portions 32 and the front surface 2a of the MEA 20.

As shown in FIG. 4, the rear surface 3Rb of the separator 3 (rear plate 3R) is provided with a plurality of sealing bead portions, that is, metal bead seals protruding rearward toward the frame 21. The plurality of bead portions include an outer bead portion 331, an inner bead portion 332, and an end bead portion 333.

The outer bead portion 331 extends along the periphery of the rear plate 3R to enclose the entirety of the through-holes 301 to 306, and has an overall substantially rectangular shape. The end bead portions 333 are provided in a number corresponding to the through-holes 301 to 306. Each of the plurality of end bead portions 333 has a substantially rectangular shape and individually encloses each of the plurality of through-holes 301 to 306. The inner bead portion 332 is provided inside the outer bead portion 331. More specifically, the inner bead portion 332 extends in a zigzag manner, passing laterally outside the end bead portions 333 surrounding the through-holes 301, 303, 304 and 306, and laterally inside the end bead portions 333 surrounding the through-holes 302 and 305. The end bead portions 333 surrounding the through-holes 302 and 305 are positioned between the outer bead portion 331 and the inner bead portion 332.

In the connection region AR3 of the separator 3, a plurality of substantially cylindrical embossments 341 and 342 are provided projecting in the front-rear direction. The protrusions 31, recess portions 32, and metal bead seals are formed by pressing the rear plate 3R. Although not illustrated, similarly on the front surface 3Fa of the separator 3 (front plate 3F), the protrusions 31, recess portions 32, and metal bead seals (outer bead portion 331, inner bead portion 332, end bead portion 333) are formed by pressing the front plate 3F.

Figure 5:
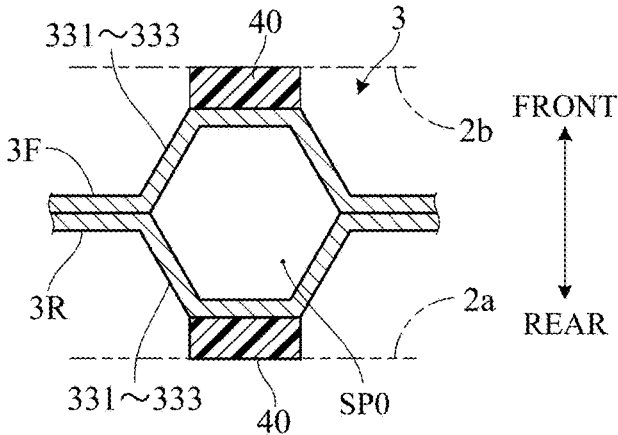
FIG. 5 is a cross-sectional view obtained by vertically cutting a bead portion of the separator.

FIG. 5 is a cross-sectional view of a main part of the separator 3 obtained by vertically cutting the bead portions 331 to 333. As illustrated in FIG. 5, the bead portions 331 to 333 have a substantially rectangular cross section, more specifically, a substantially trapezoidal cross section. The plurality of bead portions 331 to 333 of the rear plate 3R and the plurality of bead portions 331 to 333 of the front plate 3F are provided at the same position in front view, that is, in the up-down and left-right directions. Therefore, a substantially rectangular space SPO is provided between the bead portions 331 to 333 of the front plate 3F and the bead portions 331 to 333 of the rear plate 3R.

A sealing material 40 is fixed to the front surfaces of the bead portions 331 to 333 of the front plate 3F and the rear surface of the bead portions 331 to 333 of the rear plate 3R. As the sealing material 40, a constituent material having elasticity such as rubber or a resin material is used. The front sealing material 40 is pressed against the rear surface 2b (FIG. 2) of the frame 21 (FIG. 3) of the UEA 2, and the rear sealing material 40 is pressed against the front surface 2a of the frame 21. As a result, the gap between the bead portions 331 to 333 and the frame 21 is closed, and the anode flow path PAa and the cathode flow path PAc in a sealed state can be formed between the UEA 2 and the separator 3. The sealing material 40 may be omitted, and the tip end portions of the bead portions 331 to 333 may be brought into direct contact with the frame 21.

The anode flow path PAa and the cathode flow path PAc are provided inside the inner bead portion 332 in front view of the separator 3. A plurality of through-holes 301, 303, 304, and 306 are disposed inside the inner bead portion 332. However, communication between the anode flow path PAa and the through-holes 301, 303, 304, and 306 and communication between the cathode flow path PAc and the through-holes 301, 303, 304, and 306 are blocked by the end bead portion 333. The anode flow path PAa and the through-holes 301 and 306 communicate with each other via a plurality of (three in FIG. 4) tunnel portions 41 and 42 provided so as to cross the end bead portion 333. The cathode flow path PAc and the through-holes 303 and 304 communicate with each other via a plurality of (three in FIG. 4) tunnel portions 43 and 44 provided so as to cross the end bead portion 333.

Figure 6A:
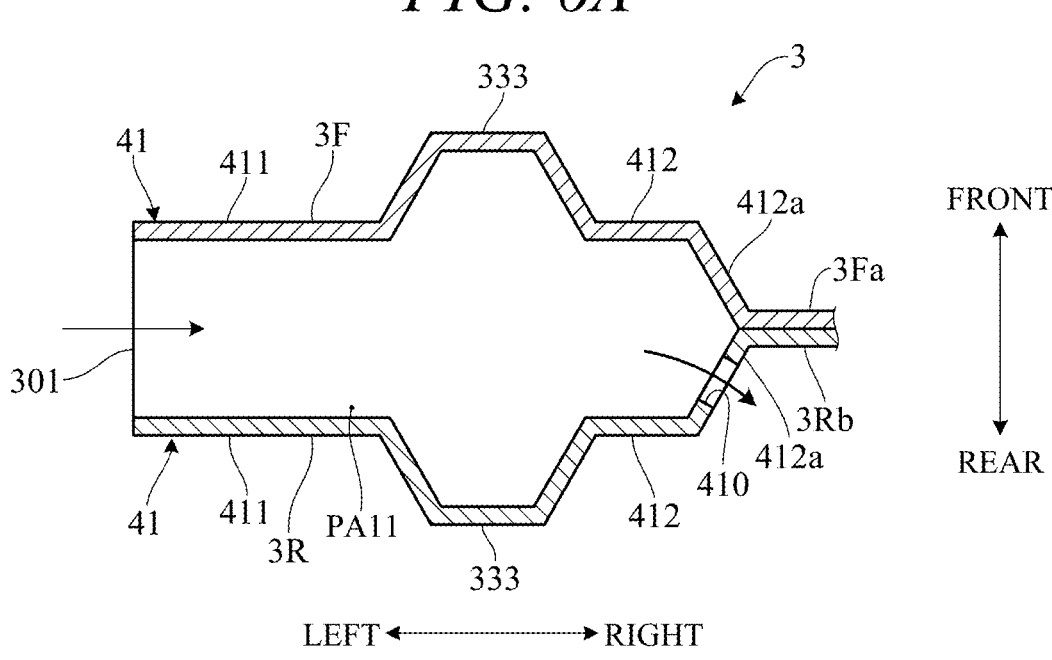
FIG. 6A is a cross-sectional view taken along line A-A in FIG. 4.

FIG. 6A is a cross-sectional view (cross-sectional view taken along line A-A in FIG. 4) illustrating the configuration of the tunnel portion 41 in the vicinity of the through-hole 301. As illustrated in FIG. 6A, the tunnel portion 41 is provided on the front plate 3F so as to protrude forward, and the tunnel portion 41 is provided on the rear plate 3R so as to protrude backward. The protrusion amount of the tunnel portion 41 in the front-rear direction is smaller than the protrusion amount of the bead portion 333 in the front-rear direction. Although not illustrated, the tunnel portion 41 has a substantially rectangular or trapezoidal cross section, and a communication flow path PA1*l* is formed between the front and rear tunnel portions 41 and 41.

In the tunnel portion 41, the left side (the through-hole 301 side) of the bead portion 333 is referred to as an outer tunnel portion 411, and the right side (the anode flow path PAa side) of the bead portion 333 is referred to as an inner tunnel portion 412. The left end of the outer tunnel portion 411 is located at the peripheral edge of the through-hole 301, and the left end of the communication flow path PA11 is opened to face the through-hole 301. The right end of the outer tunnel portion 411 penetrates the bead portion 333 and communicates with the internal space of the bead portion 333.

The left end of the inner tunnel portion 412 penetrates the bead portion 333 and communicates with the internal space of the bead portion 333. The right end portion of the inner tunnel portion 412 is provided with a tapered portion 412a whose protrusion amount gradually decreases toward the right. At the right end of the tunnel portion 41, the protrusion amount in the front-rear direction becomes 0, and the communication flow path PA11 is closed. An outlet 410 for fuel gas is opened in the tapered portion 412a of the rear plate 3R. Accordingly, the through-hole 301 and the anode flow path PAa behind the rear plate 3R communicate with each other via the communication flow path PA11 and the outlet 410. Therefore, the fuel gas flowing through the through-hole 301 can be supplied to the anode flow path PAa via the communication flow path PA11 and the outlet 410 as indicated by arrows in FIG. 6A.

Although not illustrated, the tunnel portion 42 in the vicinity of the through-hole 306 is configured similarly to the tunnel portion 41 in FIG. 6A. That is, the tunnel portion 41 and the tunnel portion 42 have a symmetrical shape with respect to an axis (not illustrated) extending in the up-down direction through the center point P in FIG. 4. Therefore, the inlet 420 for fuel gas is opened in the tapered portion at the left end portion of the tunnel portion 42 of the rear plate 3R. As a result, the fuel gas flowing through the anode flow path PAa is guided to the through-hole 306 via the inlet 420 and the communication flow path PA11 inside the tunnel portion 42.

Figure 6B:
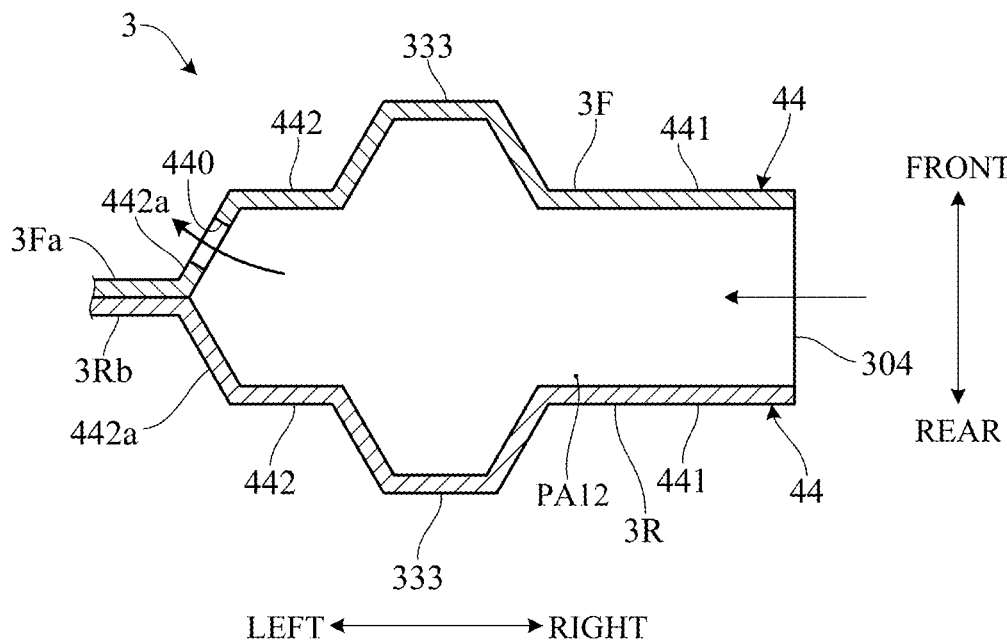
FIG. 6B is a cross-sectional view taken along line B-B in FIG. 4.

FIG. 6B is a cross-sectional view (cross-sectional view taken along line B-B in FIG. 4) illustrating the configuration of the tunnel portion 41 in the vicinity of the through-hole 304. As illustrated in FIG. 6B, the tunnel portion 44 is provided on the front plate 3F so as to protrude forward, and the tunnel portion 44 is provided on the rear plate 3R so as to protrude backward. The protrusion amount of the tunnel portion 44 in the front-rear direction is smaller than the protrusion amount of the bead portion 333 in the front-rear direction. Although not illustrated, the tunnel portion 44 has a substantially rectangular or trapezoidal cross section, and a communication flow path PA12 is formed between the front and rear tunnel portions 44 and 44.

In the tunnel portion 44, the right side (the through-hole 304 side) of the bead portion 333 is referred to as an outer tunnel portion 441, and the left side (the cathode flow path PAc side) of the bead portion 333 is referred to as an inner tunnel portion 442. The right end of the outer tunnel portion 441 is located at the peripheral edge of the through-hole 304, and the right end of the communication flow path PA12 is opened to face the through-hole 304. The left end of the outer tunnel portion 441 penetrates the bead portion 333 and communicates with the internal space of the bead portion 333.

The right end of the inner tunnel portion 442 penetrates the bead portion 333 and communicates with the internal space of the bead portion 333. The left end portion of the inner tunnel portion 442 is provided with a tapered portion 442*a* whose protrusion amount gradually decreases toward the left. At the left end of the tunnel portion 44, the protrusion amount in the front-rear direction becomes 0, and the communication flow path PA12 is closed. An outlet 440 for oxidant gas is opened in the tapered portion 442*a* of the front plate 3F. Accordingly, the through-hole 304 and the cathode flow path PAc in front of the front plate 3F communicate with each other via the communication flow path PA12 and the outlet 440. Therefore, the oxidant gas flowing through the through-hole 304 can be supplied to the cathode flow path PAc via the communication flow path PA12 and the outlet 440 as indicated by arrows in FIG. 6B.

Although not illustrated, the tunnel portion 43 in the vicinity of the through-hole 303 is configured similarly to the tunnel portion 44 in FIG. 6B. That is, the tunnel portion 43 and the tunnel portion 44 have a symmetrical shape with respect to an axis (not illustrated) extending in the up-down direction through the center point P in FIG. 4. Therefore, the inlet 430 for oxidant gas is opened in the tapered portion at the right end portion of the tunnel portion 43 of the front plate 3F. As a result, the oxidant gas flowing through the cathode flow path PAc is guided to the through-hole 303 via the inlet 430 and the communication flow path PA12 inside the tunnel portion 43.

Figure 7:
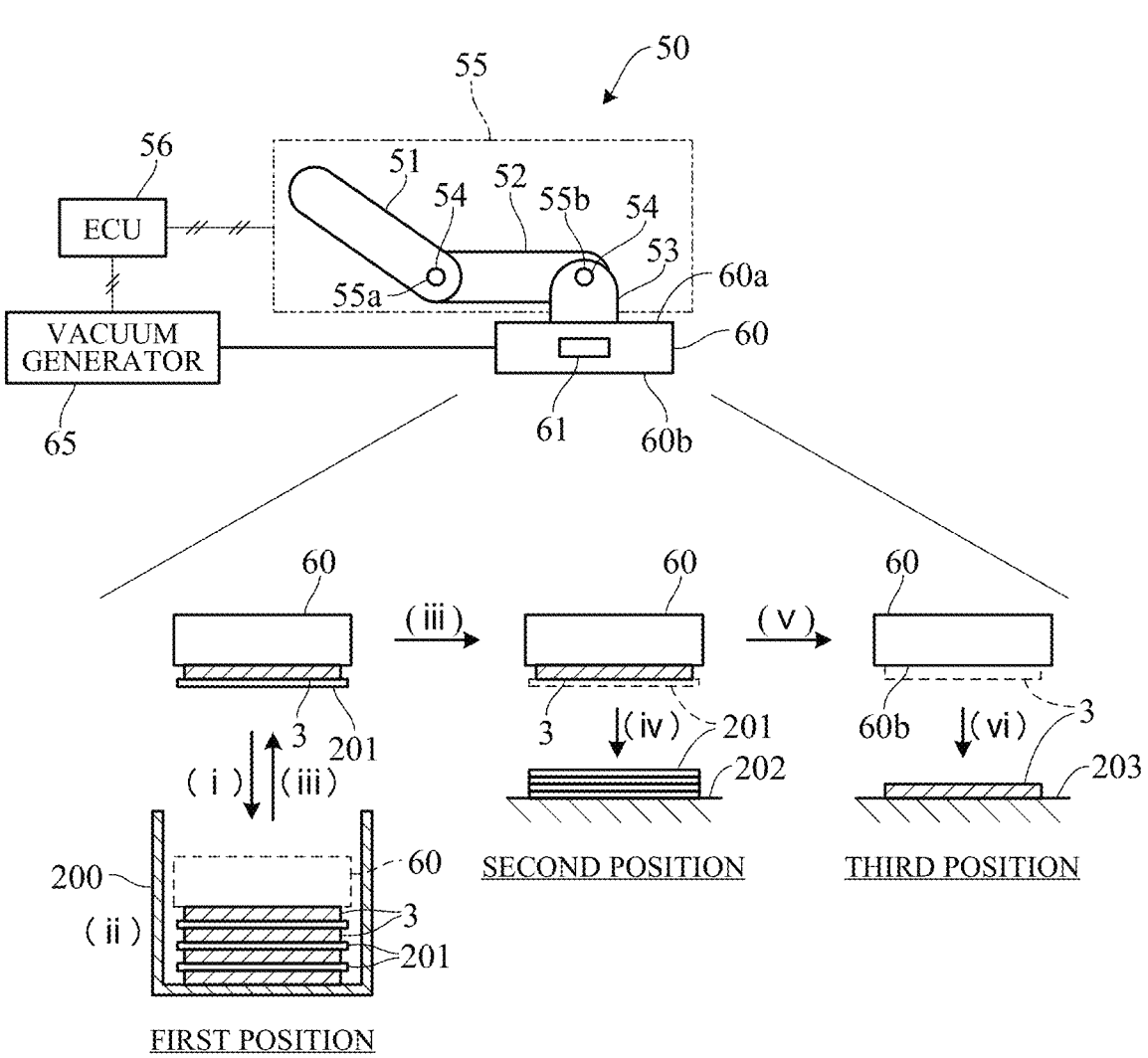
FIG. 7 is a diagram schematically illustrating an overall configuration of the fuel cell separator conveyance apparatus according to the embodiment of the present invention.

FIG. 7 is a diagram schematically illustrating an overall configuration of a fuel cell separator conveyance apparatus 50 according to this embodiment. As illustrated in FIG. 7, the fuel cell separator conveyance apparatus 50 includes an industrial robot 55 having articulated arms 51 and 52 and a hand 53 provided at the end of the arm 52, and a suction hand 60 supported by the hand 53.

The arm 51 and the arm 52 are pivotally coupled with each other through a pivot shaft 55*a*, and the arm 52 and the hand 53 are pivotally coupled with each other through a pivot shaft 55*b*. The configuration of the robot 55 (the number of arms and the like) is not limited to the illustrated one. The arms 51 and 52 and the hand 53 are rotated by the drive of an actuator 54 such as a servo motor provided on the pivot shafts 55*a* and 55*b*, for example, which changes the position and posture of the hand 53. The actuator 54 is controlled by an ECU 56. The ECU 56 is an electronic control unit including a computer having a CPU, a ROM, a RAM, and other peripheral circuits.

The suction hand 60 is formed of a plate member having a substantially rectangular shape in plan view and a constant plate thickness, and has a substantially rectangular parallelepiped shape as a whole. The suction hand 60 is supported by the hand 53 so as to be in a substantially horizontal posture. The suction hand 60 is entirely made of metal, for example. The suction hand 60 can be made of a resin material having higher rigidity than the separator 3. The suction hand 60 has an upper surface 60*a* and a lower surface 60*b*. The upper surface 60*a* is fixed to the hand 53. The lower surface 60*b* is configured as a flat surface without unevenness extending in the substantially horizontal direction.

The suction hand 60 is provided with a suction portion 61 described later. A vacuum generator 65 is connected to the suction portion 61, and the separator 3 can be sucked to the lower surface 60*b* of the suction hand 60 by the operation of the vacuum generator 65. The operation of the vacuum generator 65 is controlled by the ECU 56.

The suction hand 60 is moved from the first position to the second position by the robot 55 in the substantially horizontal posture, and then moved from the second position to the third position. At the first position, a tray 200 having an open upper surface is installed. The separator 3 and the protective sheet 201 are alternately stacked on the tray 200 in a horizontal posture. The surface of the separator 3 can be protected by stacking the separator 3 with the protective sheet 201 interposed therebetween.

The separator 3 is disposed such that a rear surface (anode flow path PAa side) 3Rb thereof faces upward, that is, the rear surface 3Rb is an upper surface. The separator 3 may be disposed such that a front surface (cathode flow path PAc side) 3Fa thereof faces upward, that is, the front surface 3Fa is an upper surface. The protective sheet 201 is a flexible, bendable, thin resin film such as polyethylene naphthalate. In the tray 200, the protective sheet 201 is in close contact with the upper surface (rear surface 3Rb) and the lower surface (front surface 3Fa) of the separator 3. The protective sheet 201 is formed in a substantially rectangular shape as a whole so as to cover the entire upper surface and lower surface of the separator 3 (see FIG. 8).

An outline of the operation of the fuel cell separator conveyance apparatus 50 is as follows. The suction hand 60 is first moved above the tray 200 by the robot 55. Then, the suction hand 60 is lowered toward the tray 300 and moved to the first position. The separator 3 disposed at the uppermost stage of the tray 200 is sucked to the lower surface 60*b* of the suction hand 60 via the suction portion 61. At this time, the protective sheet 201 on the lower surface of the separator 3 is also sucked at the same time.

Thereafter, the suction hand 60 is moved to the second position by the robot 55, and the suction of the protective sheet 201 via the suction portion 61 is released. As a result, the protective sheet 201 is detached from the lower surface of the separator 3. The detached protective sheet 201 falls on the collecting table 202 provided at the second position. Therefore, it is easy to discard and collect the protective sheet 201.

Thereafter, the suction hand 60 is moved to the third position by the robot 55, and the suction of the suction hand 60 via the suction portion 61 is released. As a result, the separator 3 is detached from the lower surface 60*b* of the suction hand 60. The detached separator 3 is mounted on the mounting table 203 provided at the third position, and is used for predetermined work. Thereafter, the suction hand 60 is returned to the first position by the robot 55, and repeats the same operation. As a result, the separators 3 stacked at the first position can be conveyed one by one to the third position in a state where the protective sheet 201 is removed.

Figure 8:
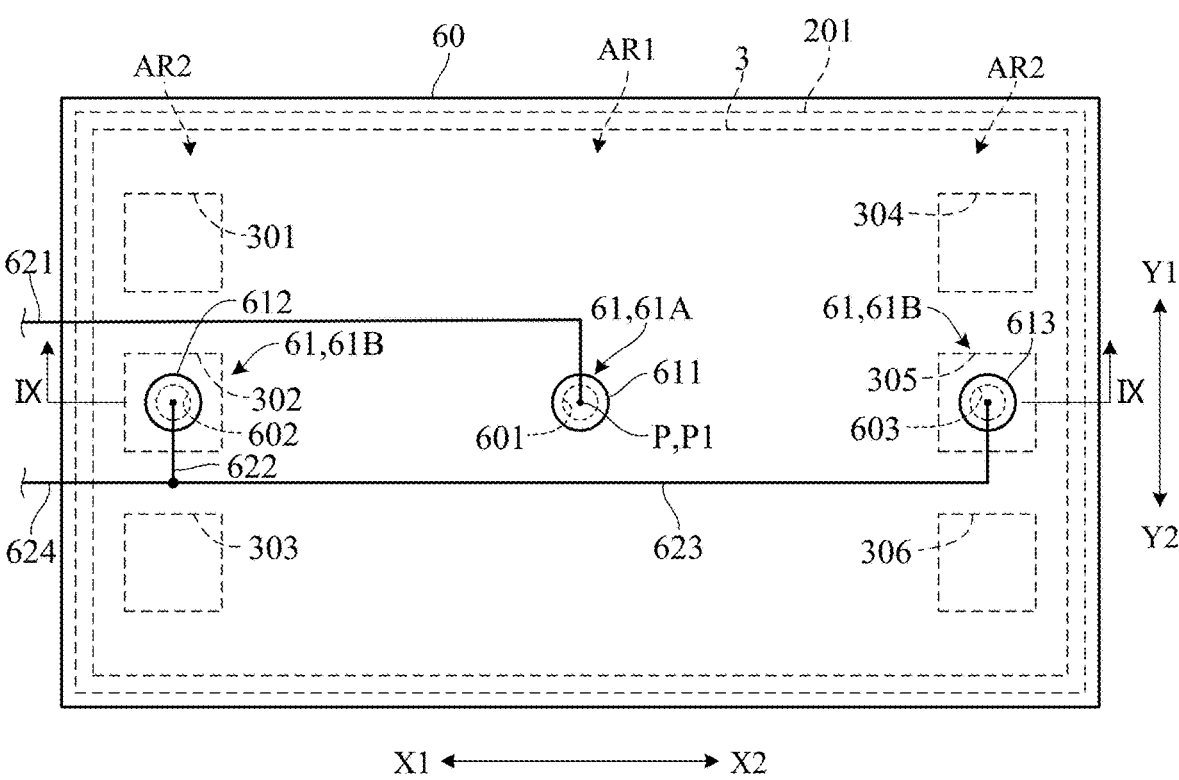
FIG. 8 is a plan view of a suction hand included in the fuel cell separator conveyance apparatus in FIG. 7.
Figure 9:
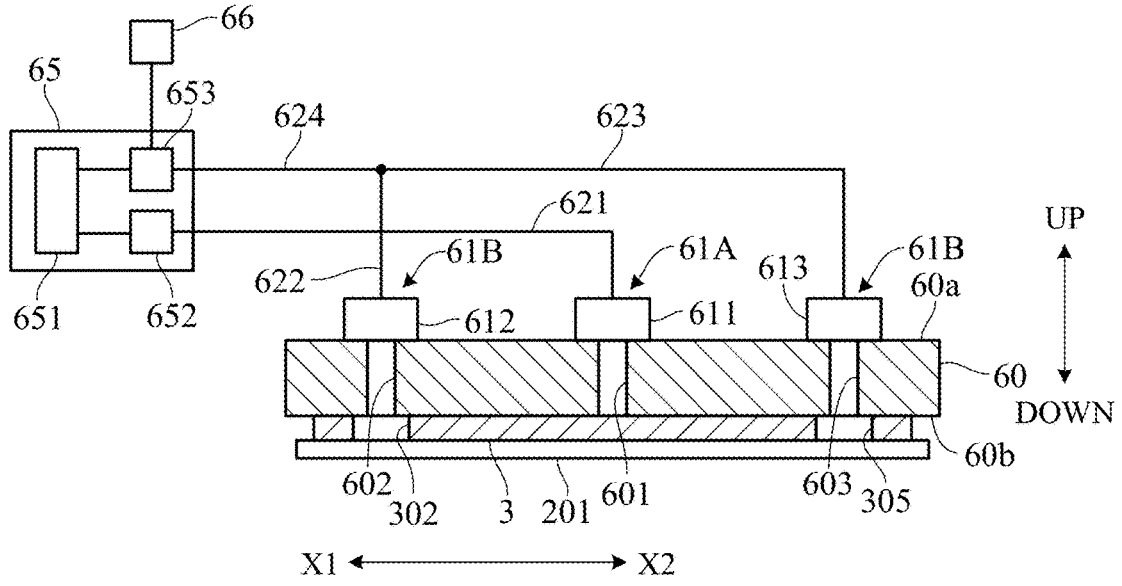
FIG. 9 is a cross-sectional view taken along line IX-IX in FIG. 8.

The configuration of the suction portion 61 provided in the suction hand 60 will be described. FIG. 8 is a plan view of the suction hand 60, and FIG. 9 is a cross-sectional view of the suction hand 60 taken along line IX-IX in FIG. 8. FIGS. 8 and 9 illustrate a state in which the separator 3 and the protective sheet 201 are sucked by the suction hand 60, and a thickness direction of the separator 3 in a substantially horizontal posture is defined as an up-down direction, a longitudinal direction (left-right direction in FIG. 4) is defined as an X1-X2 direction, and a lateral direction (up-down direction in FIG. 4) is defined as a Y1-Y2 direction. The up-down direction is a vertical direction, and the lower side corresponds to a gravity direction. In FIGS. 8 and 9, the configuration of the separator 3 is simply shown.

As illustrated in FIG. 8, similarly to the separator 3 and the protective sheet 201, the suction hand 60 has a substantially rectangular shape in plan view. The length in the X1-X2 direction and the length in the Y1-Y2 direction of the protective sheet 201 are longer than the length in the X1-X2 direction and the length in the Y1-Y2 direction of the separator 3. Therefore, the protective sheet 201 is formed to be larger than the separator 3, and the entire separator 3 is covered with the protective sheet 201.

The length in the X1-X2 direction and the length in the Y1-Y2 direction of the suction hand 60 are longer than the length in the X1-X2 direction and the length in the Y1-Y2 direction of the protective sheet 201. Therefore, the suction hand 60 is formed larger than the protective sheet 201, and the separator 3 and the protective sheet 201 are entirely covered with the suction hand 60. A center point PI passing through an intermediate point of the suction hand 60 in the X1-X2 direction and passing through an intermediate point in the Y1-Y2 direction coincides with the center point P of the separator 3.

As illustrated in FIGS. 8 and 9, the suction hand 60 includes a suction portion 61 (first suction portion 61A) at a portion facing the active region AR1 of the separator 3. The suction hand 60 further includes a suction portion 61 (second suction portion 61B) at a portion facing the end region AR2 on the X1 direction side and a portion facing the end region AR2 on the X2 direction side. The suction portion 61 includes a substantially circular through-holes 601 to 603 penetrating the suction hand 60 in the up-down direction. The through-holes 601 to 603 have the same diameter. The diameter of the through-hole 601 may be larger or smaller than the diameters of the through-holes 602 and 603.

The through-hole 601 is opened around the center point PI of the suction hand 60. The through-holes 602 and 603 are provided symmetrically in the X1-X2 direction with respect to the through-hole 601. That is, the through-hole 602 is opened at a position separated from the through-hole 601 by a predetermined distance in the X1 direction, and the through-hole 603 is opened at a position separated from the through-hole 601 by a predetermined distance in the X2 direction. The centers of the through-holes 602 and 603 coincide with the centers of the through-holes 302 and 305 of the separator 3. Therefore, the through-hole 602 and the through-hole 302 communicate with each other, and the through-hole 603 and the through-hole 305 communicate with each other. As long as the through-holes 602 and 603 and the through-holes 302 and 305 communicate with each other, the centers of the through-holes 602 and 603 and the centers of the through-holes 302 and 305 may not coincide with each other.

Pipe attachment portions 611 to 613 are provided on the upper surface 60a of the suction hand 60 so as to cover the through-holes 601 to 603 in a sealed state. End portions of the hoses 621 to 623 on one side are connected to the pipe attachment portions 611 to 613 respectively. The hoses 622 and 623 merge partway into a single hose 624.

As illustrated in FIG. 9, the vacuum generator 65 includes a vacuum source 651, such as a vacuum pump, that generates a vacuum, and a pair of electromagnetic valves 652 and 653 connected to the vacuum source 651. An end of the hose 621 is connected to the electromagnetic valve 652, and an end of the hose 624 is connected to the electromagnetic valve 653. The electromagnetic valves 652 and 653 are switched to communicate with or shut off the vacuum source 651 and the hoses 621 and 624 according to a command from the ECU 56 (FIG. 7). As a result, the vacuum source 651 and the through-holes 601 to 603 communicate with each other via the electromagnetic valves 652 and 653, and the inside of the through-holes 601 to 603 can have a negative pressure.

Figure 10:
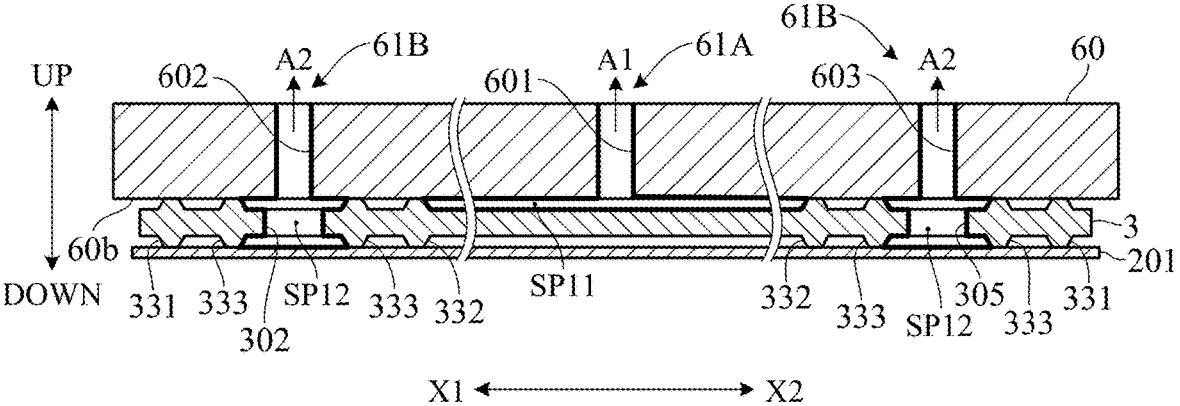
FIG. 10 is a cross-sectional view of a main part illustrating a suction operation of the suction hand.

FIG. 10 is a cross-sectional view of a main part illustrating the suction operation of the suction hand 60. As illustrated in FIG. 10, the upper surface of the outer bead portion 331, the upper surface of the inner bead portion 332, and the upper surface of the end bead portion 333 are brought into contact with the lower surface 60b of the suction hand 60. Strictly speaking, the bead portions 331 to 333 and the suction hand 60 are brought into contact with each other via the sealing material 40 (FIG. 5), but the illustration of the sealing material 40 is omitted in FIG. 10 for convenience.

The through-hole 601 at the center of the suction hand 60 communicates with a space SP11 surrounded by the lower surface 60b of the suction hand 60, the upper surface (rear surface 3Rb) of the separator 3, and the inner bead portion 332, that is, the space SP11 facing the active region AR1 of the separator 3. As a result, when air is sucked through the through-hole 601 as indicated by an arrow A1, the pressure in the space SP11 becomes negative, and the separator 3 facing the space SP11 can be sucked by the suction hand 60.

The through-holes 602 and 603 at the end portion of the suction hand 60 communicates with a space SP12 surrounded by the lower surface 60b of the suction hand 60, the upper surface of the protective sheet 201, and the end bead portion 333, that is, the space SP12 facing the end region AR2 of the separator 3 via the through-holes 302 and 305 of the separator 3. As a result, when air is sucked through the through-holes 602 and 603 as indicated by an arrow A2, the pressure in the space SP12 becomes negative, and the protective sheet 201 facing the space SP12 can be sucked to the suction hand 60 through the separator 3.

When the suction of air through the through-holes 602 and 603 is stopped from the state of FIG. 10, the suction force to the protective sheet 201 is removed. As a result, the protective sheet 201 is detached from the lower surface of the separator 3 and falls. Further, when the suction of air through the through-hole 601 is stopped, the suction force to the separator 3 is removed. As a result, the separator 3 is detached from the lower surface 60b of the suction hand 60 and falls.

In FIG. 9, the electromagnetic valve 653 may be configured as, for example, a three-way switching valve, and an air source 66 such as a compressor may be connected to the electromagnetic valve 653. In this case, the electromagnetic valve 653 is switched to shut off the hose 624 and the vacuum source 651 and communicate the hose 624 and the air source 66, or communicate the hose 624 and the vacuum source 651 and shut off the hose 624 and the air source 66 according to a command from the ECU 56. As a result, air can be blown onto the upper surface of the protective sheet 201, and even in a case where the protective sheet 201 is in close contact with the lower surface of the separator 3, the protective sheet 201 can be easily detached from the separator 3. In FIG. 9, air is blown to the protective sheet 201 via the hose 624 used at the time of suction of the protective sheet 201, so that an increase in the number of parts can be suppressed.

Figure 11:
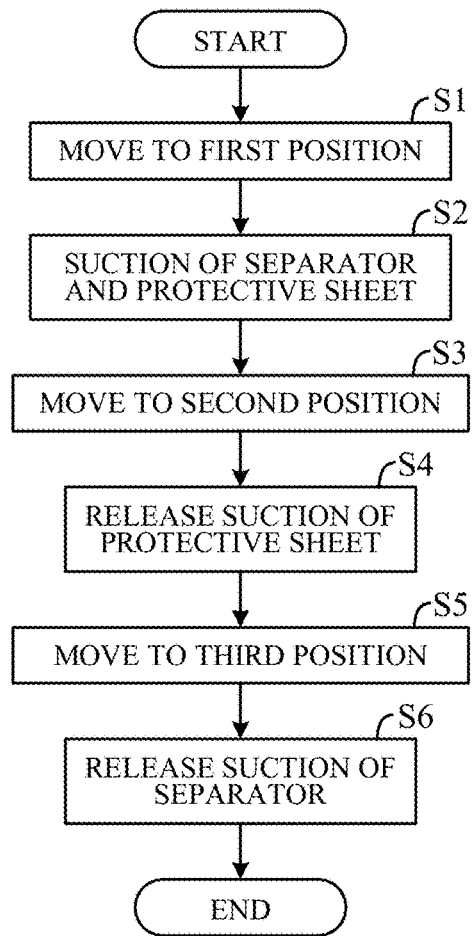
FIG. 11 is a flowchart illustrating an example of the operation of the fuel cell separator conveyance apparatus according to the embodiment of the present invention.

Main operations of the fuel cell separator conveyance apparatus 50 according to the present embodiment will be described. FIG. 11 is a flowchart illustrating an example of the operation of the fuel cell separator conveyance apparatus 50. This flowchart illustrates an operation of conveying the single separator 3 from the first position to the second position and the third position, and the operation shown in FIG. 11 is repeated by an amount corresponding to the number of separators 3 to be conveyed. The flowchart shown in FIG. 11 embodies the fuel cell separator conveyance method according to the present embodiment.

First, in S1 (S: processing step), the ECU 56 outputs a control signal to the actuator 54, and moves the suction hand 60 to the first position as illustrated in (i) of FIG. 7 (first position moving process). That is, the suction hand 60 is moved above the tray 200, and the suction hand 60 is further lowered until abutting on the upper surface of the separator 3.

Next, in S2, the ECU 56 outputs a control signal to the vacuum generator 65 (vacuum source 651, electromagnetic valves 652 and 653) to bring the inside of the space SP11 below the through-hole 601 and the inside of the space SP12 below the through-holes 602 and 603 into a vacuum state. As a result, as illustrated in (ii) of FIG. 7, the separator 3 is sucked to the lower surface 60b of the suction hand 60 via the first suction portion 61A. In addition, the protective sheet 201 is sucked via the second suction portion 61B in a state where the protective sheet 201 abuts on the lower surface of the separator 3 (suction process).

Next, in S3, the ECU 56 outputs a control signal to the actuator 54 to raise the suction hand 60 and move the suction hand to the second position above the collecting table 202 as illustrated in (iii) of FIG. 7 (second position moving process).

Next, in S4, the ECU 56 outputs a control signal to the electromagnetic valve 653 to shut off the communication between the vacuum source 651 and the hose 624. As a result, the inside of the space SP12 becomes the atmospheric pressure, the suction force with respect to the protective sheet 201 is removed, and the suction of the protective sheet 201 is released (sheet suction releasing process). As a result, as illustrated in (iv) of FIG. 7, the protective sheet 201 is detached from the separator 3 and falls on the collecting table 202. In order to facilitate detachment of the protective sheet 201, the ECU 56 may output a control signal to the electromagnetic valve 653 to communicate the air source 66 (FIG. 9) and the hose 624, and blow air to the protective sheet 201.

Next, in S5, the ECU 56 outputs a control signal to the actuator 54 to move the suction hand 60 to the third position above the mounting table 203 as illustrated in (v) of FIG. 7 (third position moving process).

Next, in S6, the ECU 56 outputs a control signal to the electromagnetic valve 652 to shut off the communication between the vacuum source 651 and the hose 621. As a result, the inside of the space SP11 becomes the atmospheric pressure, the suction force with respect to the separator 3 is removed, and the suction of the separator 3 is released (separator suction releasing process). As a result, as illustrated in (vi) of FIG. 7, the separator 3 is detached from the suction hand 60 and falls onto the mounting table 203. Thereafter, the process returns to S1, and the same operation is repeated.

In a case where the separator 3 is sucked by the suction hand 60, if there are cracks, irregularities, or adhesion of foreign matter in the bead portion of the separator 3 or the like, a sufficient negative pressure cannot be generated in the space SP11, and the separator 3 may not be sucked with a sufficient suction force. In the present embodiment, the presence or absence of such an abnormality is monitored during conveyance of the separator 3 using the suction hand 60. As a result, the quality defect of the separator alone can be grasped early and easily. In other words, in the present embodiment, when the separator 3 is conveyed from the first position to the third position in order to perform predetermined processing on the separator 3, the leak inspection of the separator 3 having the seal structure can be simultaneously performed.

According to the present embodiment, the following operations and effects are achievable.

(1) The fuel cell separator conveyance apparatus 50 is configured to convey the separator 3 for fuel cell which is stacked with the protective sheet 201 interposed therebetween and provided with the flow paths PAa and PAc of reaction gas and a plurality of through-holes 301 to 306 through which the reaction gas and a cooling medium pass (FIG. 7). The fuel cell separator conveyance apparatus 50 includes the suction hand 60 having the lower surface 60b that extends in a substantially horizontal direction and faces an upper surface of the separator 3, the suction portion 61 that is provided on the suction hand 60 and sucks the separator 3 to the suction hand 60, and the robot 55 that movably supports the suction hand 60 (FIG. 7). The suction hand 60 is provided with the through-hole 601 (a first communication hole) communicating with the flow paths PAa and PAc and the through-holes 602 and 603 (a second communication hole) communicating with the through-holes 302 and 305 of the separator 3 (FIG. 9). The suction portion 61 includes the first suction portion 61A that sucks the separator 3 to the suction hand 60 by suction through the through-hole 601, and the second suction portion 61B that sucks the protective sheet 201 to the suction hand 60 by suction through the through-holes 602 and 603 (FIGS. 8 to 10).

Thus, the separator 3 and the protective sheet 201 can be simultaneously sucked by the suction hand 60. Therefore, it is possible to prevent the protective sheet 201 from being detached from the separator 3 due to free fall at an unintended position. By releasing the operation of the second suction portion 61B, the protective sheet 201 can be detached from the separator 3. Therefore, the protective sheet 201 can be collected or discarded at a predetermined position. In addition, since the suction hand 60 having a simple configuration is used, the suction hand 60 can be configured at low cost. Further, the lower surface 60b of the suction hand 60 is a flat surface, and it is not necessary to configure the suction hand 60 such that the lower surface 60b is elastically deformed when abutting on the upper surface of the separator 3. Therefore, the suction hand 60 can be made of metal or the like, and the durability of the suction hand 60 is higher than that of a suction pad having a flexible suction surface. As a result, it is not necessary to frequently replace the suction hand, unlike the suction pad, and the separator 3 can be continuously conveyed for a long time. In order to increase the work efficiency of conveying the separator 3, it is necessary to convey the separator 3 at high speed. In this regard, according to the present embodiment, since the separator 3 can be stably held by the suction hand 60, the separator 3 can be conveyed at high speed.

(2) The flow paths PAa and PAc of the reaction gas are provided in the active region AR1 at the center of the separator 3, and the through-holes 302 and 305 are provided in the pair of end regions AR2 of the separator 3 sandwiching the active region AR1 (FIG. 4). The protective sheet 201 is disposed so as to cover the entire lower surface of the separator 3 (FIG. 8). The through-hole 601 is opened to face the active region AR1, and the through-holes 602 and 603 are opened to face the pair of end regions AR2 (FIG. 8). As a result, the separator 3 can be sucked to the suction hand 60 in a wide range. Therefore, in a case where the separator 3 has warpage or undulation, the warpage or undulation can be corrected at the time of suction to the suction hand 60, and the separator 3 can be accurately positioned and conveyed.

(3) The fuel cell separator conveyance apparatus 50 further includes the air source 66 that blows air to the protective sheet 201 through the through-holes 602 and 603 (FIG. 9). As a result, even in a case where the protective sheet 201 is in close contact with the separator 3, the protective sheet 201 can be easily detached from the separator 3.

(4) The separator 3 has the inner bead portion 332 protruding from the upper surface so as to surround the active region AR1 where the flow paths PAa and PAc of the reaction gas are provided, and the end bead portion 333 protruding from the upper surface so as to individually surround the plurality of through-holes 301 to 306 (FIG. 4). The first suction portion 61A is configured to generate a negative pressure in the space SP11 inside the inner bead portion 332 between the lower surface 60b of the suction hand 60 and the upper surface of the separator 3 (FIG. 10). The second suction portion 61B is configured to generate a negative pressure in the space SP12 inside the end bead portion 333 between the lower surface 60b of the suction hand 60 and the upper surface of the separator 3 (FIG. 10). As a result, a sufficient negative pressure can be generated in the space SP11 inside the inner bead portion 332 and the space SP12 inside the end bead portion 333. Therefore, it is not necessary to perform the suction using the large-capacity vacuum generator 65, and an increase in cost can be suppressed.

(5) The fuel cell separator conveyance apparatus 50 further includes the ECU 56 (control unit) that controls the robot 55 and the suction portion 61 (first suction portion 61A, second suction portion 61B) (FIG. 7). The ECU 56 controls the robot 55, the first suction portion 61A, and the second suction portion 61B so as to move the suction hand 60 to the first position, perform the suction by the first suction portion 61A and the suction by the second suction portion 61B after the movement of the suction hand 60 to the first position, then move the suction hand 60 from the first position to the second position, and release the suction by the second suction portion 61B while maintaining the suction by the first suction portion 61A after the movement of the suction hand 60 to the second position (FIG. 11). As a result, the protective sheet 201 sucked together with the separator 3 at the first position can be detached at the second position.

(6) The ECU 56 controls the robot 55 and the first suction portion 61A to further move the suction hand 60 from the second position to the third position, and to release the suction by the first suction portion 61A after the suction hand 60 moves to the third position (FIG. 11). As a result, the separator alone after the protective sheet 201 is detached can be conveyed to the third position.

(7) The fuel cell separator conveyance method is configured to convey the separator 3 for fuel cell which is stacked with the protective sheet 201 interposed therebetween and provided with the flow paths PAa and PAc of reaction gas and a plurality of through-holes 301 to 306 through which the reaction gas and a cooling medium pass. This fuel cell separator conveyance method includes: a process (first position moving process) of moving the suction hand 60 having the lower surface 60b extending in a substantially horizontal direction and facing an upper surface of the separator 3 to the first position such that the lower surface 60b comes into contact with the upper surface of the separator 3; a process (suction process) of, after the suction hand 60 moves to the first position, sucking the separator 3 to the suction hand 60 by suction through the through-hole 601 provided in the suction hand 60 so as to communicate with the flow paths PAa and PAc of reaction gas, and sucking the protective sheet 201 to the suction hand 60 by suction through the through-holes 602 and 603 provided in the suction hand 60 so as to communicate with the plurality of through-holes 302 and 305; a process (second position moving process) of moving the suction hand 60 from the first position to the second position; and a process (sheet suction releasing process) of releasing the suction by the second suction portion 61B while maintaining the suction by the first suction portion 61A after the suction hand 60 moves to the second position (FIG. 11). As a result, the protective sheet 201 is detached from the lower surface of the separator 3 at the second position, and it is possible to prevent the protective sheet 201 from being detached from the separator 3 due to free fall at an unintended position.

(8) The fuel cell separator conveyance method further includes a process (third position moving process) of moving the suction hand 60 from the second position to the third position, and a process (separator suction releasing process) of releasing the suction by the first suction portion 61A after the suction hand 60 moves to the third position (FIG. 11). As a result, the separator alone from which the protective sheet 201 has been removed can be conveyed to the third position.

Figure 12:
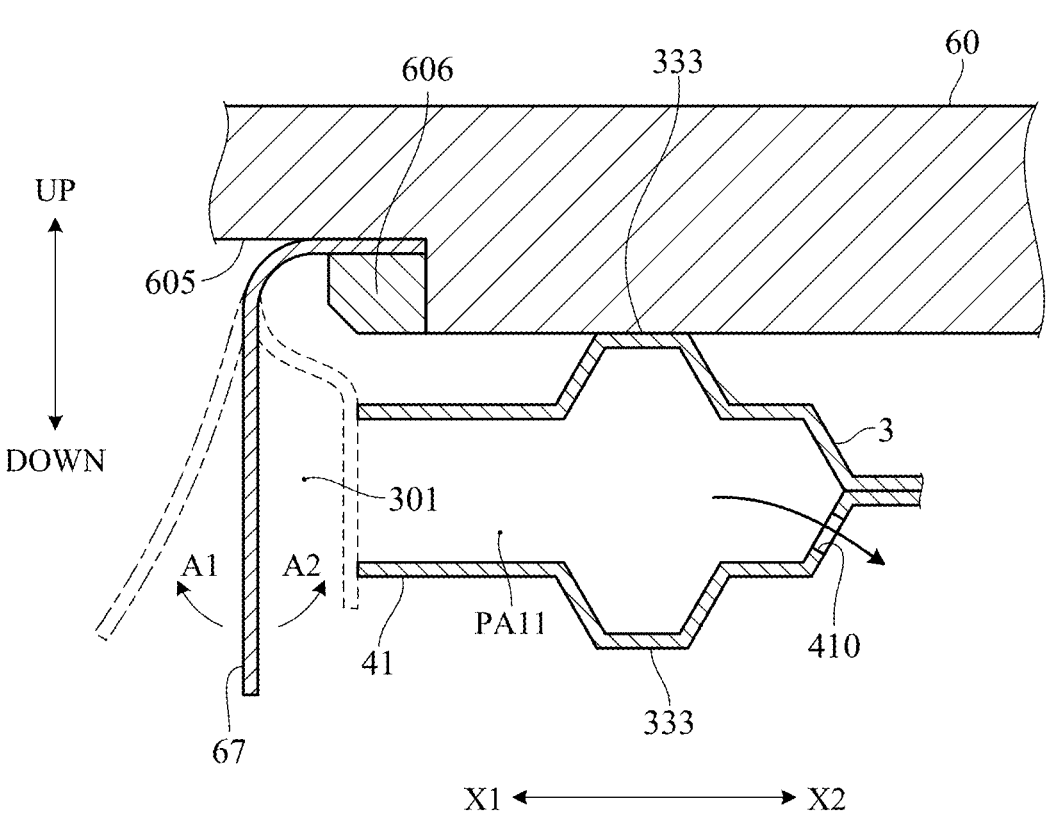
FIG. 12 is a cross-sectional view illustrating a modification of a main part of the suction hand.

The above embodiments can be modified into various forms. Hereinafter, some modifications will be described. In the above embodiment, the space SP11 between the lower surface 60b of the suction hand 60 and the upper surface of the separator 3 is brought into a negative pressure state to suck the separator 3 to the suction hand 60. Therefore, in a case where the anode flow path PAa faces the space SP11, the space SP11 communicates with the through-holes 301 and 306 via the communication flow path PA11 (FIG. 6A) inside the tunnel portions 41 and 42 (FIG. 4). Therefore, air is sucked into the space SP11 through the through-holes 301 and 306 and the communication flow path PA11, and it may be difficult to bring the inside of the space SP11 into a sufficient negative pressure state. Therefore, in order to bring the inside of the space SP11 into a sufficiently negative pressure state, the end portion of the communication flow path PA11 may be closed. FIG. 12 is a view illustrating an example of the suction hand 60 having such a configuration.

FIG. 12 illustrates a configuration of the suction hand 60 in the vicinity of the tunnel portion 41 on the X1 direction side of the separator 3. Although not illustrated, the configuration of the suction hand 60 in the vicinity of the tunnel portion 42 on the X2 direction side of the separator 3 is similar to that in FIG. 12. As illustrated in FIG. 12, a curtain 67 is attached to the suction hand 60. Specifically, the lower surface 60b of the suction hand 60 is provided with a recessed portion 605, the recessed portion 605 is provided with a detachably fixing portion 606, and the upper end portion of the curtain 67 is sandwiched between the recessed portion 605 and the fixing portion 606, whereby the curtain 67 is fixed to the suction hand 60.

The curtain 67 is formed of a flexible sheet-like or film-like member (for example, a resin material). The curtain 67 extends in the up-down direction and the Y1-Y2 direction (FIG. 8) so as to cover inlets of the plurality of tunnel portions 41 (FIG. 4) facing the through-hole 301. Before a negative pressure is generated in the space SP11, the curtain 67 hangs down as indicated by a solid line in FIG. 12.

When the suction hand 60 descends from this state, the curtain 67 is bent outward (X1 direction side) by the wind pressure as indicated by an arrow A1 in FIG. 12, and enters a state indicated by a one-dot chain line. On the other hand, when a negative pressure is generated in the space SP11, as indicated by an arrow A2 in FIG. 12, the curtain 67 is bent inward (X2 direction side) by the negative pressure and enters a state indicated by a dotted line. As a result, the inlet of the tunnel portion 41 is covered with the curtain 67, and the air is prevented from being sucked through the communication flow path PA11. Therefore, communication between the through-hole 301 and the space SP11 is blocked, and the inside of the space SP11 can be brought into a sufficient negative pressure state. As a result, the suction force of the separator 3 by the suction hand 60 can be increased.

In the above embodiment, the robot 55 with a multi-joint arm is configured to movably support the suction hand 60 from the first position to the second position and the third position, but the configuration of a support part is not limited to the above configuration. In the above embodiment, the suction hand 60 is configured in a substantially rectangular shape, but the configuration of the suction hand 60 as a moving body with the lower surface 60b (an opposing surface) facing the upper surface of the separator 3 is not limited to the above configuration.

In the above embodiment, the suction hand 60 is provided with a substantially circular through-hole 601 (a first communication hole) communicating with the anode flow path PAa, and substantially circular through-holes 602 and 603 (second communication holes) communicating with the pair of through-holes 302 and 305 through which the cooling medium passes, but the first communication hole may be provided to communicate with the cathode flow path PAc, and the second communication holes may be provided to communicate with other through-holes 301, 303, 304 and 306 through which the reaction gas passes. The number of first communication holes may be two or more. The number of second communication holes may be one or three or more.

In the above embodiment, the protective sheet 201 is formed larger than the separator 3, but it may be formed the same size as the separator 3. As long as a bead portion of the separator 3 is protected, the protective sheet 201 may be formed smaller than the separator 3. In the above embodiment, air is blown onto the protective sheet 201 from the air source 66 using the hoses 622 to 624 connecting the vacuum source 651 and the second suction portion 61B, but air may be blown onto the protective sheet 201 from the air source 66 using other hoses, and the configuration of the an air blowing part is not limited to the above configuration.

In the above embodiment, a negative pressure is generated in the space SP11 inside the inner bead portion 332 (a first seal portion) via the first suction portion 61A, but the configuration of the first suction portion 61A is not limited to the above configuration. In the above embodiment, a negative pressure is generated in the space SP12 inside the end bead portion 333 (a second seal portion) via the second suction portion 61B, but the configuration of the second suction portion 61B is not limited to the above configuration. In the above embodiment, the robot 55 and the vacuum generator 65 are controlled by commands from the ECU 56 as a control unit, but the control operation by the ECU 56 is not limited to the above configuration. In the above embodiment, the separator 3 is configured by joining a pair of plate members, that is, the front plate 3F (a first plate member) and the rear plate 3R (a second plate member), but the configuration of the separator is not limited to the above configuration. In the above embodiment, when conveying the separator 3, the front surface 3Fa of the front plate 3F becomes the upper surface, and the rear surface 3Rb of the rear plate 3R becomes the lower surface, but the configuration of the upper and lower surfaces is not limited to the above configuration.

The above embodiment can be combined as desired with one or more of the above modifications. The modifications can also be combined with one another.

According to the present invention, it is possible to detach a protective sheet from a separator at a desired position.

Above, while the present invention has been described with reference to the preferred embodiments thereof, it will be understood, by those skilled in the art, that various changes and modifications may be made thereto without departing from the scope of the appended claims.

What is claimed is:

1. A fuel cell separator conveyance apparatus configured to convey a separator for a fuel cell, the separator being stacked through a protective sheet and having an upper surface and a lower surface, a flow path for a reaction gas being formed in the separator, a plurality of through-holes through which the reaction gas and a cooling medium pass are provided in the separator, the fuel cell separator conveyance apparatus comprising:

a movable body including an opposing surface extending in a substantially horizontal direction and facing the upper surface of the separator;

a suction part provided on the movable body and configured to generate a suction so as to hold the separator on the movable body; and a support part configured to movably support the movable body, wherein a first communication hole communicating with the flow path and a second communication hole communicating with at least one of the plurality of through-holes are provided in the movable body, the suction part includes a first section suction part configured to hold the separator on the movable body through the suction via the first communication hole, and a second suction part configured to hold the protective sheet on the movable body through the suction via the second communication hole, the flow path is provided in a central region of the separator, the plurality of through-holes are provided in a pair of end regions of the separator on both sides of the central region, the protective sheet is disposed so as to cover an entire surface of the lower surface of the separator, the first communication hole is opened to face the central region, and the second communication hole is opened to face each of the pair of end regions.

2. The fuel cell separator conveyance apparatus according to claim 1, further comprising an air blowing part configured to blow an air to the protective sheet through the second communication hole.

3. The fuel cell separator conveyance apparatus according to claim 1, wherein the separator includes a first seal portion protruded upward from the upper surface so as to surround a region where the flow path is provided, and second seal portions protruded upward from the upper surface so as to surround each of the plurality of through-holes separately, the first suction part is configured to generate a negative pressure in a space inside the first seal portion between the opposing surface of the movable body and the upper surface of the separator, and the second suction part is configured to generate a negative pressure in spaces inside the second seal portions between the opposing surface of the movable body and the upper surface of the separator.

4. The fuel cell separator conveyance apparatus according to claim 3, wherein the separator includes a pair of upper and lower plate members designated as a first plate member and a second plate member and joined together, and each of the first seal portion and the second seal portions are protruded upward from an upper surface of the first plate member and downward from a lower surface of the second plate member.

5. The fuel cell separator conveyance apparatus according to claim 1, further comprising an electronic control unit including a microprocessor and a memory connected to the microprocessor, wherein the microprocessor is configured to perform controlling the support part and the suction part so as to move the movable body to a first position and so that the first suction part and the second suction part generate the suction after the movable body reaches the first position, to move the movable body from the first position to a second position after the first suction part and the second suction part generate the suction, and to release the suction by the second suction part while maintaining the suction by the first suction part after the movable body reaches the second position.

6. The fuel cell separator conveyance apparatus according to claim 5, wherein the microprocessor is configured to perform the controlling including further controlling the support part and the suction part so as to move the movable body from the second position to a third position, and to release the suction by the first suction part after the movable body reaches the third position.

7. The fuel cell separator conveyance apparatus according to claim 1, wherein the first communication hole is a single through-hole provided at a center portion of the movable body and penetrating the movable body, and the second communication hole is a pair of through-holes provided on both sides of the first communication hole and penetrating the movable body.

8. A fuel cell separator conveyance apparatus configured to convey a separator for a fuel cell, the separator being stacked through a protective sheet and having an upper surface and a lower surface, a flow path for a reaction gas being formed in the separator, a plurality of through-holes through which the reaction gas and a cooling medium pass are provided in the separator, the fuel cell separator conveyance apparatus comprising:

a movable body including an opposing surface extending in a substantially horizontal direction and facing the upper surface of the separator;

a suction part provided on the movable body and configured to generate a suction so as to hold the separator on the movable body; and a support part configured to movably support the movable body, wherein a first communication hole communicating with the flow path and a second communication hole communicating with at least one of the plurality of through-holes are provided in the movable body, the suction part includes a first suction part configured to hold the separator on the movable body through the suction via the first communication hole, and a second suction part configured to hold the protective sheet on the movable body through the suction via the second communication hole, and the fuel cell separator conveyance apparatus further comprises an air blowing part configured to blow an air to the protective sheet through the second communication hole.

9. The fuel cell separator conveyance apparatus according to claim 8, wherein the separator includes a first seal portion protruded upward from the upper surface so as to surround a region where the flow path is provided, and second seal portions protruded upward from the upper surface so as to surround each of the plurality of through-holes separately, the first suction part is configured to generate a negative pressure in a space inside the first seal portion between the opposing surface of the movable body and the upper surface of the separator, and the second suction part is configured to generate a negative pressure in spaces inside the second seal portions between the opposing surface of the movable body and the upper surface of the separator.

10. The fuel cell separator conveyance apparatus according to claim 9, wherein the separator includes a pair of upper and lower plate members designated as a first plate member and a second plate member and joined together, and each of the first seal portion and the second seal portions are protruded upward from an upper surface of the first plate member and downward from a lower surface of the second plate member.

11. The fuel cell separator conveyance apparatus according to claim 8, further comprising an electronic control unit including a microprocessor and a memory connected to the microprocessor, wherein the microprocessor is configured to perform controlling the support part and the suction part so as to move the movable body to a first position and so that the first suction part and the second suction part generate the suction after the movable body reaches the first position, to move the movable body from the first position to a second position after the first suction part and the second suction part generate the suction, and to release the suction by the second suction part while maintaining the suction by the first suction part after the movable body reaches the second position.

12. The fuel cell separator conveyance apparatus according to claim 11, wherein the microprocessor is configured to perform the controlling including further controlling the support part and the suction part so as to move the movable body from the second position to a third position, and to release the suction by the first suction part after the movable body reaches the third position.

13. The fuel cell separator conveyance apparatus according to claim 8, wherein the first communication hole is a single through-hole provided at a center portion of the movable body and penetrating the movable body, and the second communication hole is a pair of through-holes provided on both sides of the first communication hole and penetrating the movable body.

14. A fuel cell separator conveyance apparatus configured to convey a separator for a fuel cell, the separator being stacked through a protective sheet and having an upper surface and a lower surface, a flow path for a reaction gas being formed in the separator, a plurality of through-holes through which the reaction gas and a cooling medium pass are provided in the separator, the fuel cell separator conveyance apparatus comprising:

a movable body including an opposing surface extending in a substantially horizontal direction and facing the upper surface of the separator;

a suction part provided on the movable body and configured to generate a suction so as to hold the separator on the movable body; and a support part configured to movably support the movable body, wherein a first communication hole communicating with the flow path and a second communication hole communicating with at least one of the plurality of through-holes are provided in the movable body, the suction part includes a first suction part configured to hold the separator on the movable body through the suction via the first communication hole, and a second suction part configured to hold the protective sheet on the movable body through the suction via the second communication hole, the separator includes a first seal portion protruded upward from the upper surface so as to surround a region where the flow path is provided, and second seal portions protruded upward from the upper surface so as to surround each of the plurality of through-holes separately, the first suction part is configured to generate a negative pressure in a space inside the first seal portion between the opposing surface of the movable body and the upper surface of the separator, and the second suction part is configured to generate a negative pressure in spaces inside the second seal portions between the opposing surface of the movable body and the upper surface of the separator.

15. The fuel cell separator conveyance apparatus according to claim 14, wherein the separator includes a pair of upper and lower plate members designated as a first plate member and a second plate member and joined together, and each of the first seal portion and the second seal portions are protruded upward from an upper surface of the first plate member and downward from a lower surface of the second plate member.

16. The fuel cell separator conveyance apparatus according to claim 14, further comprising an electronic control unit including a microprocessor and a memory connected to the microprocessor, wherein the microprocessor is configured to perform controlling the support part and the suction part so as to move the movable body to a first position and so that the first suction part and the second suction part generate the suction after the movable body reaches the first position, to move the movable body from the first position to a second position after the first suction part and the second suction part generate the suction, and to release the suction by the second suction part while maintaining the suction by the first suction part after the movable body reaches the second position.

17. The fuel cell separator conveyance apparatus according to claim 16, wherein the microprocessor is configured to perform the controlling including further controlling the support part and the suction part so as to move the movable body from the second position to a third position, and to release the suction by the first suction part after the movable body reaches the third position.

18. The fuel cell separator conveyance apparatus according to claim 14, wherein the first communication hole is a single through-hole provided at a center portion of the movable body and penetrating the movable body, and the second communication hole is a pair of through-holes provided on both sides of the first communication hole and penetrating the movable body.

\* \* \* \* \*